Figure 1:
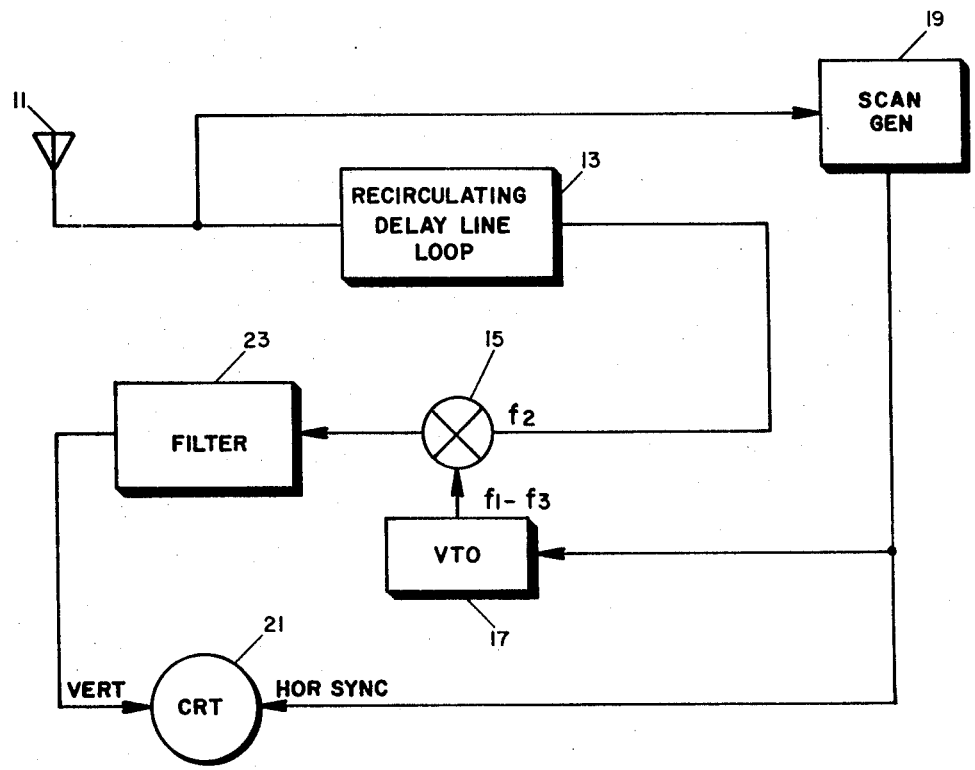

United States Patent
Williams et al.

[15] 3,649,920
[45] Mar. 14, 1972

[54] BUFFERED MICROSWEEP RECEIVER

[72] Inventors: Richard E. Williams, Reston; Fred J. Gartzke, Fairfax, both of Va.

[73] Assignee: Scope-Incorporated, Reston, Va.

[22] Filed: Dec. 18, 1969

[21] Appl. No.: 886,263

[52] U.S. Cl. .................................................. 325/363, 325/77
[51] Int. Cl. ........................................... H04b 1/00, H04b 1/36
[58] Field of Search ............... 325/332, 333, 334, 335, 336, 325/337, 363, 369, 370; 334/18, 20, 21; 324/77 C

[56] References Cited

UNITED STATES PATENTS

| | | | |
|---|---|---|---|
| 2,967,998 | 7/1961 | Hurvitz | 325/332 |
| 2,658,138 | 11/1953 | Samuelson | 325/334 |
| 2,997,650 | 8/1961 | Applebaum | 324/77 |

*Primary Examiner*—Richard Murray
*Assistant Examiner*—Barry Leibowitz
*Attorney*—John E. Benoit

[57] ABSTRACT

A frequency measuring receiver which takes a captured RF pulse or a plurality of pulses and stretches them into a train of closely spaced pulses by means of a recirculating delay-line loop. The pulses in the loop are scanned by a voltage tuned oscillator and presented to a panoramic display device.

15 Claims, 2 Drawing Figures

BUFFERED MICROSWEEP RECEIVER

This invention relates generally to an instantaneous frequency measuring receiver and more particularly to a buffered microsweep receiver for measuring frequency. Such a device searches a region in the spectrum of radio frequency electromagnetic wave energy to determine the presence therein of signal energy.

There are a number of different types of frequency measuring receivers known and in use today. Most of these receivers have certain advantages and disadvantages which determine the use of the particular receiver for the existing conditions.

One type of proposed device is known as a microsweep receiver. Although this receiver was developed a number of years ago, it has not been used extensively to date because of several inherent disadvantages.

The microsweep receiver is fundamentally a superheterodyne utilizing a very rapidly sweeping local oscillator able to encompass an octave in a period of time, such as one microsecond. The sweep is triggered by the arrival at the receiver of a pulse, and thus creates a need for circuit responses measured in nanoseconds. Microsweep receivers originally used bandwidth oscillators as the sweeping oscillators and rather elaborate methods were employed to apply successive sweep rate reductions in the vicinity of the intercepted frequency. The reductions were necessary because of the frequency-time constraint $$\frac{\partial f}{\partial t} \leq (BW)^2$$

where $\partial f/\partial t$ = sweep rate in hertz per second
BW = bandwidth of IF channel If, for example, the microsweep receiver were to sweep a 2 GHz band in one microsecond the IF bandwidth would have to be equal to, or greater than, $\sqrt{2 \times 10^{15}} = 45$ MHz. This, of course, restricts the frequency measurement resolution. If it were necessary to capture a quarter-microsecond pulse, the 4 to 1 increase in the necessary sweep rate would reduce the resolution to 90 MHz.

One way to avoid this problem is to sweep at an extraordinarily high rate and initially capture the signal in a very broadband IF strip. The IF output can trigger a sweep rate reduction so that the signal can be recaptured in a narrower offset IF strip. Such complexities have prevented the microsweep receiver from receiving general acceptance.

An object of the present invention is to provide an improved microsweep receiver which obviates most of the disadvantages discussed above.

A further object of the invention is to provide a buffered microsweep receiver which stretches the intercepted RF pulses by means of a recirculating delay-line loop.

Another object of this invention is to provide an instantaneous frequency measuring receiver having high sensitivity and simultaneous-pulse capability.

Figure 2:
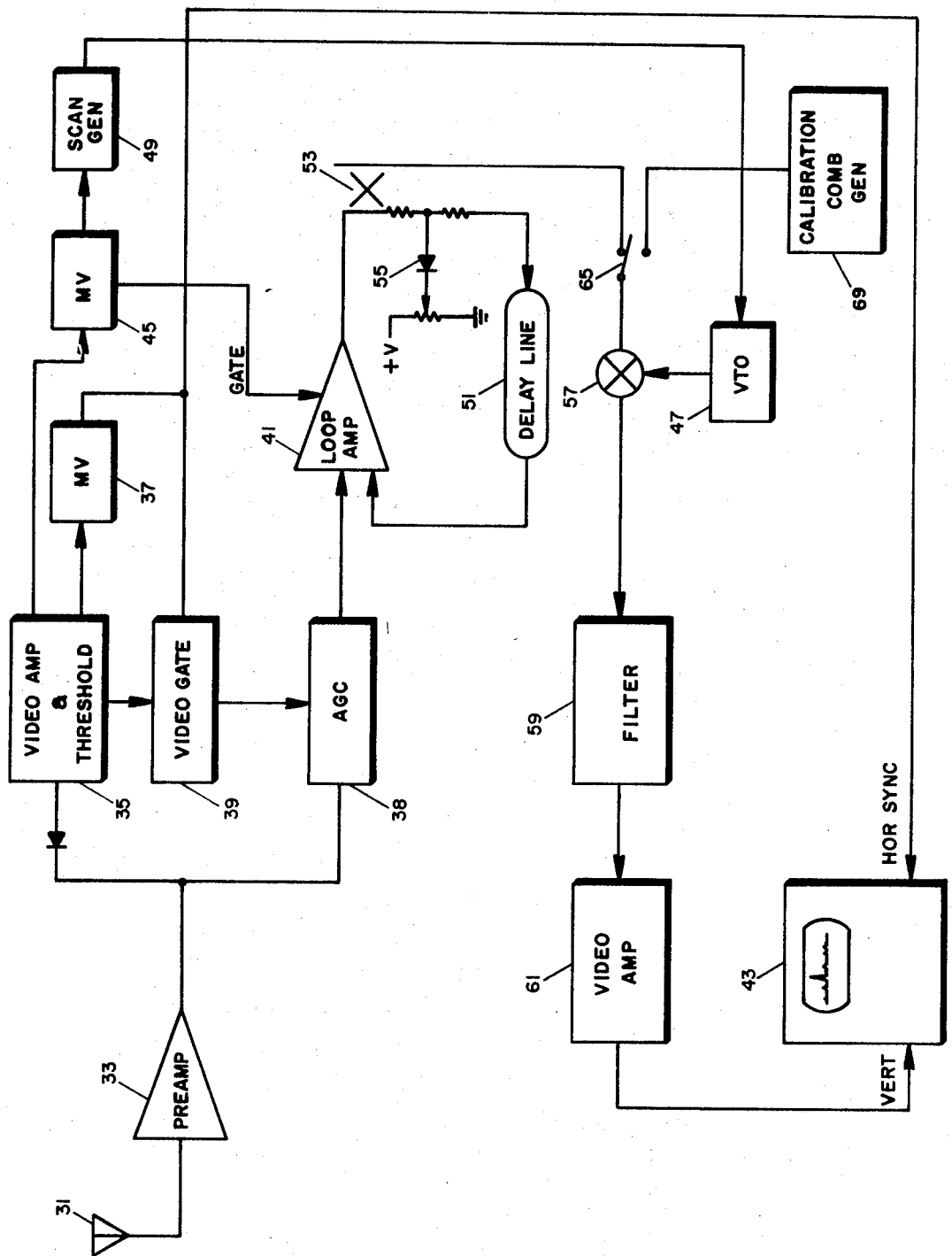

These and other objects of the invention will become obvious from the following description when taken together with the drawings wherein:

FIG. 1 is a schematic diagram of the basic concept of the present invention; and FIG. 2 is a schematic diagram of an illustrative implementation of the present invention.

Broadly speaking the present invention provides a microsweep frequency measuring receiver having a recirculating delay-line loop for stretching the intercepted RF pulses into a train of closely spaced pulses. These pulses are then scanned by an oscillator means and presented as a display upon a display scope or the like.

Turning now to FIG. 1, there is shown an antenna 11 for intercepting RF pulses. These pulses are fed to a recirculating delay-line loop 13 which stretches them into a predetermined time duration. For purposes of illustration, the output of the delay line loop is labeled as frequency $f_2$. These pulses are mixed in mixer 15 with the output of voltage tunable oscillator 17 which provides a sweep across the band of frequencies of interest, $f_1$–$f_3$. The oscillator 17 is started by scan generator 19 which simultaneously triggers a sweep to commence a panoramic display on scope 21. The output of mixer 15 is applied to the vertical deflection circuits of scope 21 through an IF filter 23.

Turning now to FIG. 2, there is shown an illustrative detailed schematic of one form of the present invention.

A broadband preamplifier 33 such as a travelling wave tube amplifier, a tunnel-diode amplifier, or a transistor amplifier is provided to raise the signal level of the captured pulse from antenna 31 so that it may be detected and amplified by the video amplifier and threshold circuit 35.

When a pulse is received and the video amplifier threshold is exceeded, a one-shot multivibrator 37 is triggered. This causes an AGC gate to be controllably opened by video gate 39 to allow a normalized RF signal to pass into loop amplifier 41 as indicated. The duration of the normalized RF signal is approximately equal to the delay of delay-line 51. Therefore, by the time the signal has passed through the delay-line, AGC gate 38 is closed. At the same time a sweep is triggered to commence a panoramic display on scope 43.

A second one-shot multivibrator 45 is also triggered so as to gate loop amplifier 41 and trigger voltage-tunable-oscillator 47 via scan generator 49.

The recirculating delay-line loop is shown as including gated broadband loop amplifier 41 and a delay line 51 which may be of the coaxial type. A pad 53 may be used in series with delay line 51 to assist in broad-banding the loop and is adjusted for a basic loop gain slightly greater than unity. The arriving pulse is thus turned into a train of very closely spaced pulses recurring for an interval as determined by the loop amplifier gate.

The gain of the loop is critical within certain limits. If it substantially exceeds unity, strong-signal capture effects will cause the receiver to be less able to handle simultaneous pulses of differing strengths. If, on the other hand, the loop gain is substantially less than unity, the pulse train will die out before the end of the interval of recurring pulses.

If the recirculating loop were completely linear, a gain peak at a frequency other than the signal could cause oscillator noise "take-over." To avoid this situation there may be imposed a slight strong-signal-capture upon each recirculation by a nonlinear device such as diode 55. This nonlinearity, in effect, regulates the gain of the loop. The gain exceeds unity for a low level signal, but is reduced to approximate unity by the limiting action of diode 55 for a strong signal.

During the interval in which the input pulse is recirculating in the loop, energy is coupled out of the line and applied to mixer 57. The voltage tuned oscillator 47 scans the band of interest at that point so as to produce a beat frequency between the input signal and the frequency of the oscillator as extracted from mixer 57.

If simultaneous signals are received, they will be gated into the recirculating line at the same time. Provided their amplitudes do not depart by a value greater than the effective simultaneous-signal dynamic range of the recirculating loop and display, they will both be scanned by voltage tuned oscillator 47 to provide proper panoramic indications. This simultaneous-signal capability will hold true regardless of the number of simultaneous frequencies involved.

The output of mixer 57 passes through filter 59 and is logarithmically amplified in amplifier 61. The output of amplifier 61 is applied to the vertical deflection circuits of panoramic display device 43.

Although the system as described above is sufficient to supply adequate accuracy in frequency readout, greater calibration accuracy may be obtained by switching in a set of spectral lines from a calibration comb generator 69. When switch 65 is so activated, precise lines at predetermined intervals are imposed upon the panoramic display.

It should be noted that, as a practical manner, the pulses from the recirculating delay line become, in effect, one single stretched pulse and could even overlap slightly.

If the signal $f_2$ is made equal to the scan of the oscillator $f_1$-$f_3$, then the filter 23 would be of zero-frequency or homodyne form.

As will be obvious from the above description, the present invention provides a relatively simple and inexpensive system which is able to handle and measure a number of simultaneous pulses frequencies. It is noted, however, that the description and drawings are illustrative only since various individual components may be used within the system. For instance, the display could be digitized by means such as an intervelometer and threshold circuit in place of the panoramic display. Accordingly, the invention is to be limited only by the scope of the following claims.

We claim:

1. A frequency measuring receiver for detecting the presence of signal energy within a predetermined bandwidth comprising,
   recirculating delay-line loop means for converting a received radio frequency signal into a train of closely spaced radio frequency pulses recurring for a predetermined interval of time,
   gating means coupled between said recirculating delay-line loop and the received radio frequency signal for preventing further signal input into said delay-line loop during said predetermined interval of time,
   oscillator means for scanning the contents of said recirculating loop within said predetermined interval of time so as to produce video signals, and
   means for receiving said video signals and presenting a display thereof.

2. The receiver of claim 1 wherein
   said recirculating delay-line loop means comprises
   a gated broadband loop amplifier coupled to the output of said gating means, and
   a delay-line having a fixed time delay interval coupled between the output and the input of said gated broadband loop amplifier.

3. The receiver of claim 2 wherein said loop is of the traveling-wave tube type.

4. The receiver of claim 2 wherein said loop amplifier is of the tunnel-diode type.

5. The receiver of claim 2 wherein said loop amplifier is of the transistor type.

6. The receiver of claim 1 wherein the gain of the circulating delay-line loop is substantially unity.

7. The receiver of claim 1 wherein said oscillator means comprises a voltage tuned oscillator.

8. The receiver of claim 1 further comprising
   calibration comb generator means for imposing spectral lines upon said display.

9. The receiver of claim 1 further comprising
   a nonlinear means in said recirculating loop for imposing strong-signal-capture upon each recirculation.

10. A frequency measuring receiver for detecting the presence of signal energy within a predetermined bandwidth comprising
    recirculating delay-line loop means for converting a received radio frequency signal into a train of closely spaced radio frequency pulses recurring for a predetermined interval of time,
    gating means coupled between said recirculating delay-line loop and the received radio frequency signal for preventing further signal input into said delay-line loop during said predetermined interval of time,
    oscillator means for scanning the contents of said recirculating loop within said predetermined interval of time so as to produce a beat frequency between said signal and the frequency of said oscillator means,
    scanning waveform means to control the frequency of said oscillator means,
    filter means to extract said beat frequency, and
    display means wherein the output of said filter means is displayed as a function of said scanning waveform.

11. The receiver of claim 10 wherein said filter means is of zero-frequency or homodyne form.

12. The receiver of claim 10 further comprising
    envelope-extraction means in said filter means so as to produce video signals at said filter means output.

13. The receiver of claim 10 further comprising
    triggering means responsive to said received signal and connected so as to activate said scanning waveform means.

14. A frequency measuring receiver for detecting the presence of signal energy within a predetermined bandwidth comprising,
    recirculating delay-line loop means for converting a received radio frequency signal into a train of closely spaced radio frequency pulses recurring for a predetermined interval of time,
    gating means coupled between said recirculating delay-line loop means and the received radio frequency signal for preventing further signal input into said delay-line loop during said predetermined interval of time,
    means for scanning the contents of said recirculating loop within said predetermined interval of time so as to produce video signals, and
    means for processing said video signals so as to measure the frequency of said signal energy.

15. A frequency measuring receiver for detecting the presence of signal energy within a predetermined bandwidth comprising,
    recirculating delay-line loop means for converting a received radio frequency signal into a train of closely spaced radio frequency pulses recurring for a predetermined interval of time,
    gating means coupled between said recirculating delay-line loop means and the received radio frequency signal for preventing further signal input into said delay-line loop during said predetermined interval of time,
    means for measuring the contents of said recirculating loop within said predetermined interval of time so as to produce video signals, and
    means for processing said video signals so as to measure the frequency of said signal energy.

* * * * *